United States Patent
Lee et al.

(10) Patent No.: US 8,882,091 B2
(45) Date of Patent: Nov. 11, 2014

(54) VIBRATION ISOLATION SYSTEM

(75) Inventors: Taeoh Lee, Keller, TX (US); Michael R. Smith, Colleyville, TX (US); Frank B. Stamps, Colleyville, TX (US); David E. Heverly, Jr., Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 237 days.

(21) Appl. No.: 13/294,230

(22) Filed: Nov. 11, 2011

(65) Prior Publication Data
US 2013/0119591 A1     May 16, 2013

(51) Int. Cl.
F16F 5/00      (2006.01)
F16F 13/24     (2006.01)
B64C 27/00     (2006.01)

(52) U.S. Cl.
CPC ........... *F16F 13/24* (2013.01); *B64C 2027/002* (2013.01)
USPC ................. 267/140.14; 267/140.11; 188/161; 188/317; 188/322.22

(58) Field of Classification Search
USPC ................. 267/140.14, 35, 140.11, 140.15; 188/275, 298, 317, 322.15, 322.18, 188/322.22, 156, 158, 161, 162; 244/54; 248/562, 636
See application file for complete search history.

(56) References Cited

U.S. PATENT DOCUMENTS

| | | | |
|---|---|---|---|
| 2,819,131 A | 5/1955 | Lankford |
| 2,964,272 A | 7/1955 | Olson |
| 3,088,062 A | 4/1963 | Hudimac |
| 4,236,607 A | 12/1980 | Halwes et al. |
| 4,452,437 A | 6/1984 | Lochner |
| 4,600,863 A | 7/1986 | Chaplin et al. |
| 4,629,039 A | 12/1986 | Imoto et al. |
| 4,723,085 A | 2/1988 | Mukohjima et al. |
| 4,725,019 A | 2/1988 | White |
| 4,869,474 A | 9/1989 | Best et al. |
| 5,022,628 A | 6/1991 | Johnson et al. |
| 5,130,948 A | 7/1992 | Laukien et al. |
| 5,174,552 A | 12/1992 | Hodgson et al. |
| 5,265,552 A | 11/1993 | Taylor |

(Continued)

FOREIGN PATENT DOCUMENTS

| CA | 2182275 A1 | 6/1996 |
|---|---|---|
| CA | 2422391 A1 | 2/2007 |

(Continued)

OTHER PUBLICATIONS

Extended European Search Report from application 11195436.8-1264. Issued from the European Patent Office dated May 21, 2012, 6 pages.

(Continued)

*Primary Examiner* — Pamela Rodriguez
(74) *Attorney, Agent, or Firm* — James E. Walton; Brian E. Harris

(57) ABSTRACT

A vibration isolator includes a housing having an upper fluid chamber, a lower fluid chamber, a piston, a tuning passage, and a linear inductance motor assembly for changing the isolation frequency of the vibration isolator. The piston is resiliently disposed within the housing. A vibration tuning fluid is located in the upper fluid chamber, the lower fluid chamber, and the tuning passage. The linear inductance motor assembly includes a magnet member and an inductance coil at least partially surrounding the magnet member. A control system is configured to selectively actuate the magnet member; wherein selective actuation of the magnet member selectively imparts a pumping force on the tuning fluid, thereby changing the isolation frequency.

14 Claims, 9 Drawing Sheets

(56) References Cited

U.S. PATENT DOCUMENTS

| | | | |
|---|---|---|---|
| 5,332,203 A | 7/1994 | Gossman et al. | |
| 5,435,531 A | 7/1995 | Smith et al. | |
| 5,439,082 A | 8/1995 | McKeown et al. | |
| 5,458,222 A | 10/1995 | Pla et al. | |
| 5,520,375 A | 5/1996 | Leibach et al. | |
| 5,568,847 A | 10/1996 | Guilloud et al. | |
| 5,704,596 A | 1/1998 | Smith et al. | |
| 5,732,905 A | 3/1998 | Krysinski | |
| 5,788,372 A | 8/1998 | Jones et al. | |
| 5,803,213 A | 9/1998 | Davis et al. | |
| 5,848,782 A | 12/1998 | Hein et al. | |
| 5,906,254 A | 5/1999 | Schmidt et al. | |
| 5,927,699 A | 7/1999 | Nakajima et al. | |
| 5,947,457 A | 9/1999 | Swanson et al. | |
| 5,957,440 A | 9/1999 | Jones et al. | |
| 6,009,983 A | 1/2000 | Stamps et al. | |
| 6,032,936 A | 3/2000 | Redinger | |
| 6,116,179 A | 9/2000 | Swinbanks et al. | |
| 6,123,312 A | 9/2000 | Dai | |
| 6,129,306 A | 10/2000 | Pham | |
| 6,217,011 B1 | 4/2001 | Redinger | |
| 6,293,532 B2 | 9/2001 | McGuire | |
| 6,340,153 B1 | 1/2002 | Miesner | |
| 6,389,941 B1 | 5/2002 | Michler | |
| 6,394,432 B1 | 5/2002 | Whiteford | |
| 6,427,815 B1 | 8/2002 | Zeller | |
| 6,454,206 B2 | 9/2002 | Vincent | |
| 6,695,106 B2 | 2/2004 | Smith et al. | |
| 7,013,832 B2 | 3/2006 | Sexton et al. | |
| 2002/0060268 A1 | 5/2002 | Smith et al. | |
| 2006/0151272 A1 | 7/2006 | Smith et al. | |

FOREIGN PATENT DOCUMENTS

| | | |
|---|---|---|
| CA | 2485830 A1 | 2/2007 |
| CN | 101871499 A | 10/2010 |
| DE | 4407962 C1 | 6/1995 |
| EP | 0290181 A | 11/1988 |
| EP | 0528592 A1 | 2/1993 |
| EP | 0537927 B1 | 4/1993 |
| EP | 0554057 | 8/1993 |
| EP | 0760437 A | 3/1997 |
| EP | 1334289 B1 | 8/2003 |
| FR | 2703121 | 9/1994 |
| GB | 2358900 A | 8/2001 |
| JP | 61171686 | 2/1986 |
| WO | 83/03700 A1 | 10/1983 |
| WO | 88/05506 | 7/1988 |
| WO | 89/05930 A1 | 6/1989 |
| WO | 91/15687 A1 | 10/1991 |
| WO | 03/104675 A | 12/2003 |

OTHER PUBLICATIONS

Canadian Office Action in related Canadian patent application No. 2,789,472, 3 pages, mailed Dec. 19, 2013.
Chinese Office Action in related Chinese patent application No. 2012103858462, dated Jun. 3, 2014.
International Search Report of the International Searching Authority mailed by ISA/USA, U.S. Patent and Trademark Office on Jan. 25, 2010 for International Patent Application No. PCT/US09/36871.
International Search Report and the Written Opinion of the International Searching Authority mailed by ISA/USA, U.S. Patent and Trademark Office on Jan. 28, 2010 for International Patent Application No. PCT/US09/66263, 8 pages.
Chinese First Office Action in Chinese counterpart Application No. 200910225341.8, issued by State Intellectual Property Office of the People's Republic of China, Sep. 1, 2011.
Office Action from U.S. Patent and Trademark Office on Nov. 10, 2011 from corresponding U.S. Appl. No. 10/528,920.
Office Action from U.S. Patent and Trademark Office on Jul. 26, 2011 from corresponding U.S. Appl. No. 10/528,920.
Office Action from U.S. Patent and Trademark Office on Mar. 29, 2011 from corresponding U.S. Appl. No. 10/528,920.
Office Action from U.S. Patent and Trademark Office on Oct. 21, 2010 from corresponding U.S. Appl. No. 10/528,920.
Office Action in Canadian counterpart Application No. 2,497,417, issued by Canadian Intellectual Property Office, Jan. 15, 2010.
International Search Report and Written Opinion for PCT/US07/79686 dated Sep. 10, 2008.
International Preliminary Report on Patentability for PCT/US07/79686 dated Dec. 14, 2010.
First Office Action in Chinese Application No. 200780100866.8 by Chinese Patent Office, dated Apr. 25, 2011.
Office Action in Canadian counterpart Application No. 2,497,417, issued by Canadian Intellectual Property Office, Dec. 16, 2010.
European Search Report in European counterpart Application No. 09169361.4, completed by European Patent Office, Dec. 9, 2010.
Nixon M.W. et al, Tiltrotor Vibration Reduction Through Higher Harmonic Control, Journal of the American Helicopter Society, Jul. 1998, 235-245, vol. 43, No. 3, Alexandria, VA, US.
European Search Report in European counterpart Application No. 09169320, completed by European Patent Office, Dec. 14, 2010, 3 pages.
European Search Report in European counterpart Application No. 09169354, completed by European Patent Office, Dec. 14, 2010, 7 pages.
European Search Report in European counterpart Application No. 09169360.6, issued by European Patent Office, Dec. 30, 2010, 8 pages.
European Search Report in European counterpart Application No. 09169365, completed by European Patent Office, Dec. 14, 2010, 7 pages.
European Search Report in European counterpart Application No. 09169361, completed by European Patent Office, Dec. 9, 2010, 6 pages.
Notice of Allowance in Canadian counterpart Application No. 2,497,417, issued by Canadian Intellectual Property Office, Jul. 6, 2011.
European Search Report in European counterpart Application No. 03816302.8, completed by European Patent Office, Jul. 27, 2006, 7 pages.
International Preliminary Examination Report of the International Preliminary Examination Authority mailed by ISA/USA, U.S. Patent and Trademark Office on Jul. 1, 2005 for International Patent Application No. PCT/US03/30324, 7 pages.
International Preliminary Report on Patentability of the International Searching Authority mailed by ISA/USA, U.S. Patent and Trademark Office on Nov. 18, 2011 for International Patent Application No. PCT/US08/87419, 4 pages.
International Search Report and Written Opinion of the International Searching Authority mailed by ISA/USA, U.S. Patent and Trademark Office on Feb. 3, 2009 for International Patent Application No. PCT/US08/87419.

VIBRATION ISOLATION SYSTEM

BACKGROUND

1. Field of the Invention

The present application relates in general to active vibration control. More specifically, the present application relates to a system for isolating mechanical vibrations in structures or bodies that are subject to harmonic or oscillating displacements or forces. The system of the present application is well suited for use in the field of aircraft, in particular, helicopters and other rotary wing aircraft.

2. Description of Related Art

For many years, effort has been directed toward the design of apparatus for isolating a vibrating body from transmitting its vibrations to another body. Such apparatuses are useful in a variety of technical fields in which it is desirable to isolate the vibration of an oscillating or vibrating device, such as an engine, from the remainder of the structure. Typical vibration isolation and attenuation devices ("isolators") employ various combinations of the mechanical system elements (springs and mass) to adjust the frequency response characteristics of the overall system to achieve acceptable levels of vibration in the structures of interest in the system. One field in which these isolators find a great deal of use is in aircraft, wherein vibration-isolation systems are utilized to isolate the fuselage or other portions of an aircraft from mechanical vibrations, such as harmonic vibrations, which are associated with the propulsion system, and which arise from the engine, transmission, and propellers or rotors of the aircraft.

Vibration isolators are distinguishable from damping devices in the prior art that are erroneously referred to as "isolators." A simple force equation for vibration is set forth as follows:

$$F = m\ddot{x} + c\dot{x} + kx$$

A vibration isolator utilizes inertial forces ($m\ddot{x}$) to cancel elastic forces ($kx$). On the other hand, a damping device is concerned with utilizing dissipative effects ($c\dot{x}$) to remove energy from a vibrating system.

A marked departure in the field of vibration isolation, particularly as applied to aircraft and helicopters is disclosed in commonly assigned U.S. Pat. No. 4,236,607, titled "Vibration Suppression System," issued 2 Dec. 1980, to Halwes, et al. (Halwes '607). Halwes '607 is incorporated herein by reference. Halwes '607 discloses a vibration isolator, in which a dense, low-viscosity fluid is used as the "tuning" mass to counterbalance, or cancel, oscillating forces transmitted through the isolator. This isolator employs the principle that the acceleration of an oscillating mass is 180° out of phase with its displacement.

In Halwes '607, it was recognized that the inertial characteristics of a dense, low-viscosity fluid, combined with a hydraulic advantage resulting from a piston arrangement, could harness the out-of-phase acceleration to generate counter-balancing forces to attenuate or cancel vibration. Halwes '607 provided a much more compact, reliable, and efficient isolator than was provided in the prior art. The original dense, low-viscosity fluid contemplated by Halwes '607 was mercury, which is toxic and highly corrosive.

Since Halwes' early invention, much of the effort in this area has been directed toward replacing mercury as a fluid or to varying the dynamic response of a single isolator to attenuate differing vibration modes. An example of the latter is found in commonly assigned U.S. Pat. No. 5,439,082, titled "Hydraulic Inertial Vibration Isolator," issued 8 Aug. 1995, to McKeown, et al. (McKeown '082). McKeown '082 is incorporated herein by reference.

Several factors affect the performance and characteristics of the Halwes-type isolator, including the density and viscosity of the fluid employed, the relative dimensions of components of the isolator, and the like. One improvement in the design of such isolators is disclosed in commonly assigned U.S. Pat. No. 6,009,983, titled "Method and Apparatus for Improved Isolation," issued 4 Jan. 2000, to Stamps et al. (Stamps '983). In Stamps '983, a compound radius at the each end of the tuning passage was employed to provide a marked improvement in the performance of the isolator. Stamps '983 is incorporated herein by reference.

Another area of improvement in the design of the Halwes-type isolator has been in an effort directed toward a means for changing the isolator's frequency in order to increase the isolator's effectiveness during operation. One development in the design of such isolators is disclosed in commonly assigned U.S. Pat. No. 5,435,531, titled "Vibration Isolation System," issued 25 Jul. 1995, to Smith et al. (Smith '531). Smith '531 is incorporated herein by reference. In Smith '531, an axially extendable sleeve is used in the inner wall of the tuning passage in order to change the length of the tuning passage, thereby changing the isolation frequency. Another development in the design of tunable Halwes-type isolators was disclosed in commonly assigned U.S. Pat. No. 5,704,596, titled "Vibration Isolation System," issued 6 Jan. 1998, to Smith et al. (Smith '596). Smith '596 is incorporated herein by reference. In Smith '596, a sleeve is used in the inner wall of the tuning passage in order to change the cross sectional area of the tuning passage itself, thereby changing the isolation frequency during operation. Both Smith '531 and Smith '596 were notable attempts to actively tune the isolator.

Another development in the area of vibration isolation is the tunable vibration isolator disclosed in U.S. Pat. No. 6,695,106, titled "Method and Apparatus for Improved Vibration Isolation," issued 24 Feb. 2004, to Smith et al, which is hereby incorporated by reference.

Although the foregoing developments represent great strides in the area of vibration isolation, many shortcomings remain.

DESCRIPTION OF THE DRAWINGS

The novel features believed characteristic of the system of the present application are set forth in the appended claims. However, the system itself, as well as, a preferred mode of use, and further objectives and advantages thereof, will best be understood by reference to the following detailed description when read in conjunction with the accompanying drawings, wherein:

Figure 1:
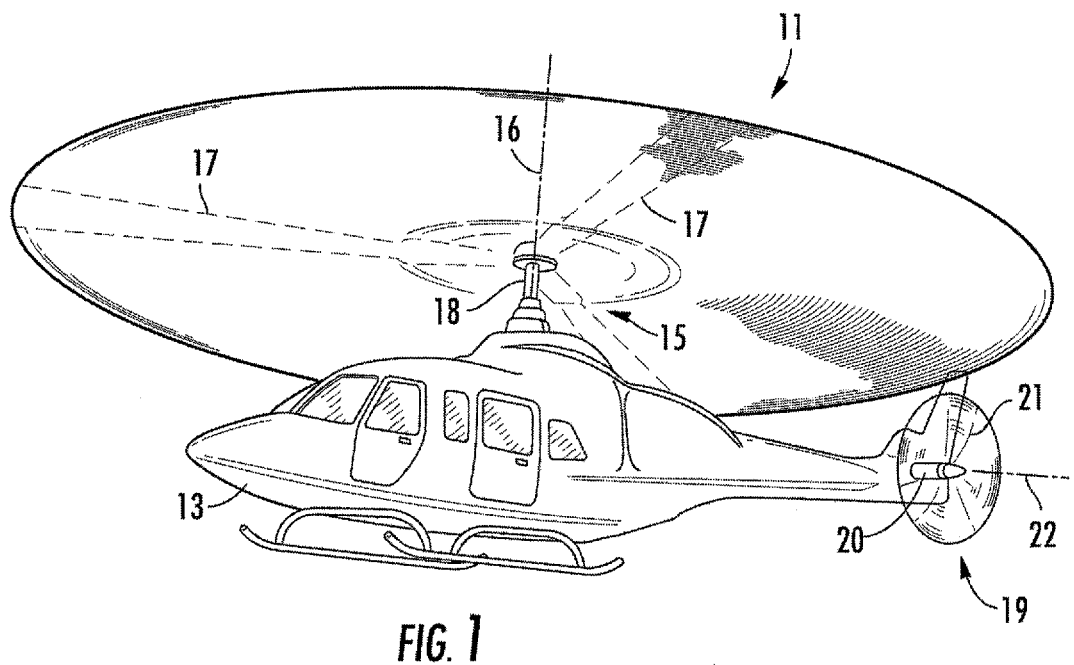
FIG. 1 is a perspective view of a helicopter according to the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Referring to FIG. 1 in the drawings, a helicopter 11 according to the present application is illustrated. Helicopter 11 has a fuselage 13 and a main rotor assembly 15, including main rotor blades 17 and a main rotor mast 18. Helicopter 11 has a tail rotor assembly 19, including tail rotor blades 21 and a tail rotor mast 20. Main rotor blades 17 generally rotate about a vertical axis 16 of main rotor mast 18. Tail rotor blades 21 generally rotate about a lateral axis 22 of tail rotor mast 20. Helicopter 11 also includes a vibration isolation system according to the present application for isolating fuselage 13 or other portions of helicopter 11 from mechanical vibrations, such as harmonic vibrations, which are associated with the propulsion system and which arise from the engine, transmission, and rotors of helicopter 11.

Figure 2A:
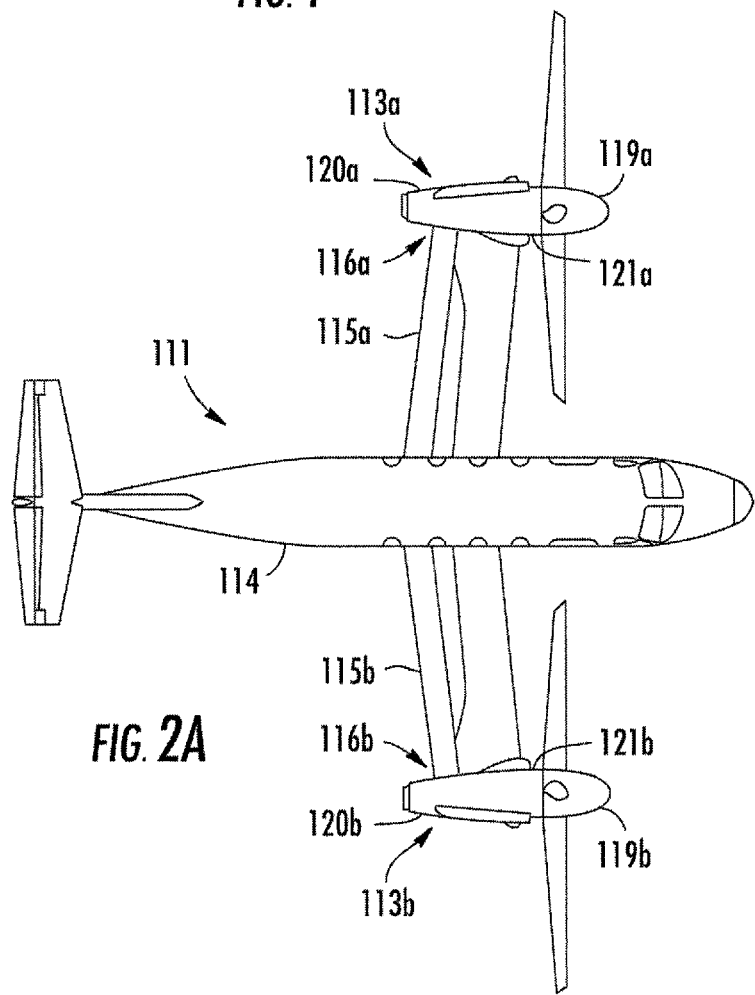
FIG. 2A is a plan view of a tilt rotor aircraft according to the present application in an airplane mode.
Figure 2B:
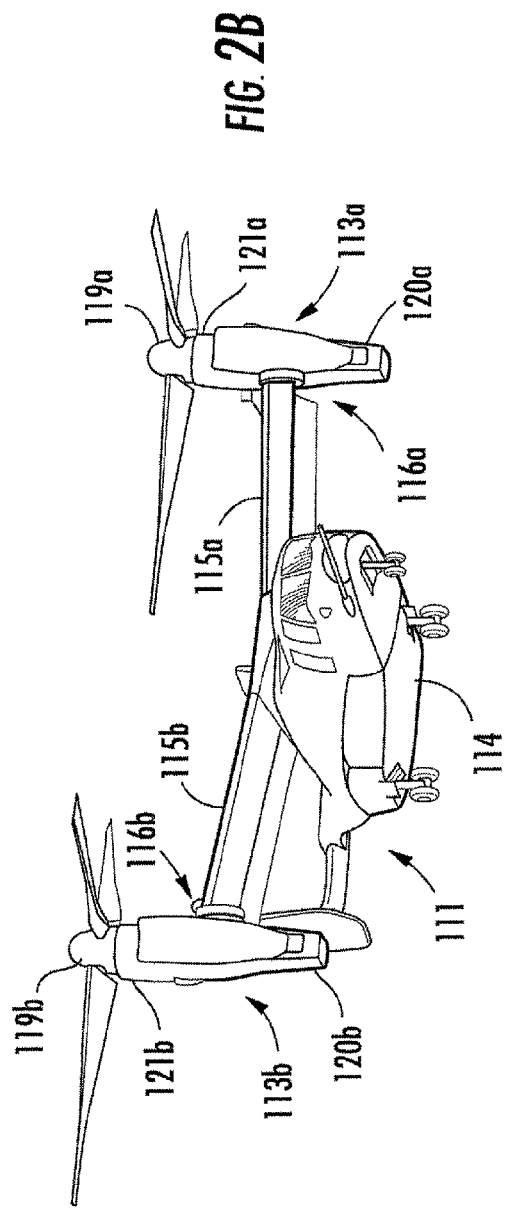
FIG. 2B is a perspective view of a tilt rotor aircraft according to the present application in a helicopter mode.

The vibration isolation system of the present application may also be utilized on other types of rotary wing aircraft. Referring now to FIGS. 2A and 2B in the drawings, a tilt rotor aircraft 111 according to the present application is illustrated. As is conventional with tilt rotor aircraft, rotor assemblies 113a and 113b are carried by wings 115a and 115b, and are disposed at end portions 116a and 116b of wings 115a and 115b, respectively. Tilt rotor assemblies 113a and 113b include nacelles 120a and 120b, which carry the engines and transmissions of tilt rotor aircraft 111, as well as, rotor hubs 119a and 119b on forward ends 121a and 121b of tilt rotor assemblies 113a and 113b, respectively.

Tilt rotor assemblies 113a and 113b move or rotate relative to wing members 115a and 115b between a helicopter mode in which tilt rotor assemblies 113a and 113b are tilted upward, such that tilt rotor aircraft 111 flies like a conventional helicopter; and an airplane mode in which tilt rotor assemblies 113a and 113b are tilted forward, such that tilt rotor aircraft 111 flies like a conventional propeller driven aircraft. In FIG. 2A, tilt rotor aircraft 111 is shown in the airplane mode; and in FIG. 2B, tilt rotor aircraft 111 is shown in the helicopter mode. As shown in FIGS. 2A and 2B, wings 115a and 115b are coupled to a fuselage 114. Tilt rotor aircraft 111 also includes a vibration isolation system according to the present application for isolating fuselage 114 or other portions of tilt rotor aircraft 111 from mechanical vibrations, such as harmonic vibrations, which are associated with the propulsion system and which arise from the engines, transmissions, and rotors of tilt rotor aircraft 111.

Figure 3:
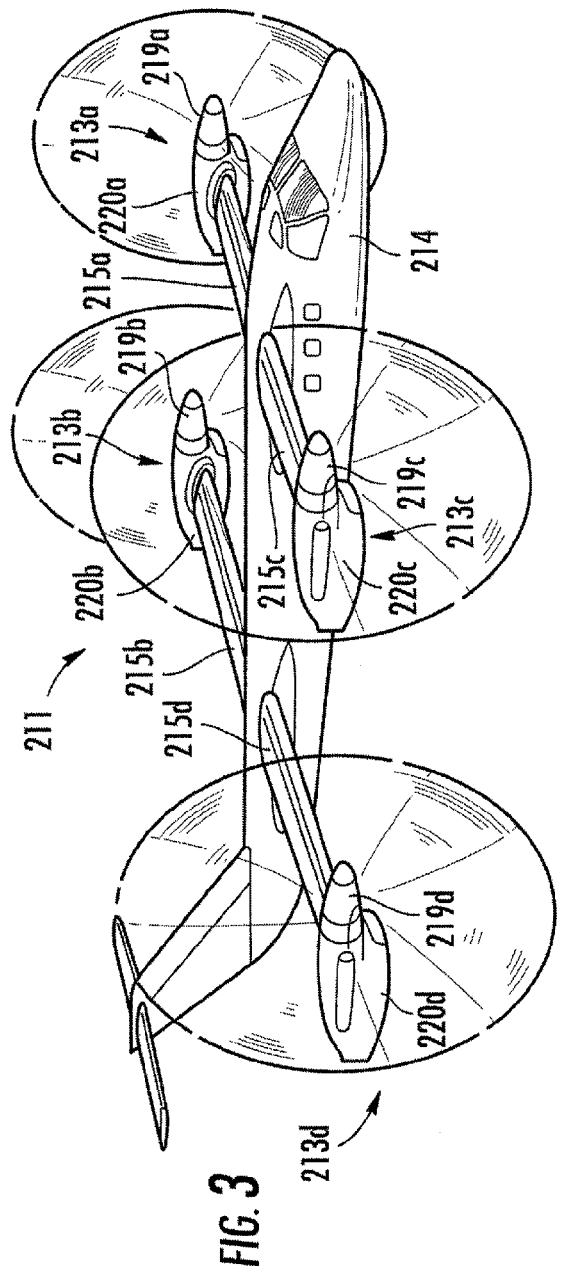
FIG. 3 is a perspective view of a quad tilt rotor aircraft according to the present application in an airplane mode.

Referring now to FIG. 3 in the drawings, a quad tilt rotor aircraft 211 according to the present application is illustrated. As with the tilt rotor aircraft 111 of FIGS. 2A and 2B, rotor assemblies 213a, 213b, 213c, and 213d are carried by a forward wing 215a, 215c, and an aft wing 215b, 215d, respectively. Tilt rotor assemblies 213a, 213b, 213c, and 213d include nacelles 220a, 220b, 220c, and 220d, which carry the engines and transmissions of quad tilt rotor aircraft 211, as well as, rotor hubs 219a, 219b, 219c, and 219d on forward ends of tilt rotor assemblies 213a, 213b, 213c, and 213d, respectively.

Tilt rotor assemblies 213a, 213b, 213c, and 213d move or rotate relative to wing members 215a, 215b, 215c, and 215d between a helicopter mode in which tilt rotor assemblies 213a, 213b, 213c, and 213d are tilted upward, such that quad tilt rotor aircraft 211 flies like a conventional helicopter; and an airplane mode in which tilt rotor assemblies 213a, 213b, 213c, and 213d are tilted forward, such that quad tilt rotor aircraft 211 flies like a conventional propeller driven aircraft. In FIG. 3, quad tilt rotor aircraft 111 is shown in the airplane mode. As shown in FIG. 3, wings 215a, 215b, 215c, and 215d are coupled to a fuselage 214. Tilt rotor aircraft 211 also includes a vibration isolation system according to the present application for isolating fuselage 214 or other portions of quad tilt rotor aircraft 211 from mechanical vibrations, such as harmonic vibrations, which are associated with the propulsion system and which arise from the engines, transmissions, and rotors of quad tilt rotor aircraft 211. It should be understood that the present application may be used with any aircraft on which it would be desirable to have vibration isolation according to the present application, including unmanned aerial vehicles that are remotely piloted.

Figure 4A:
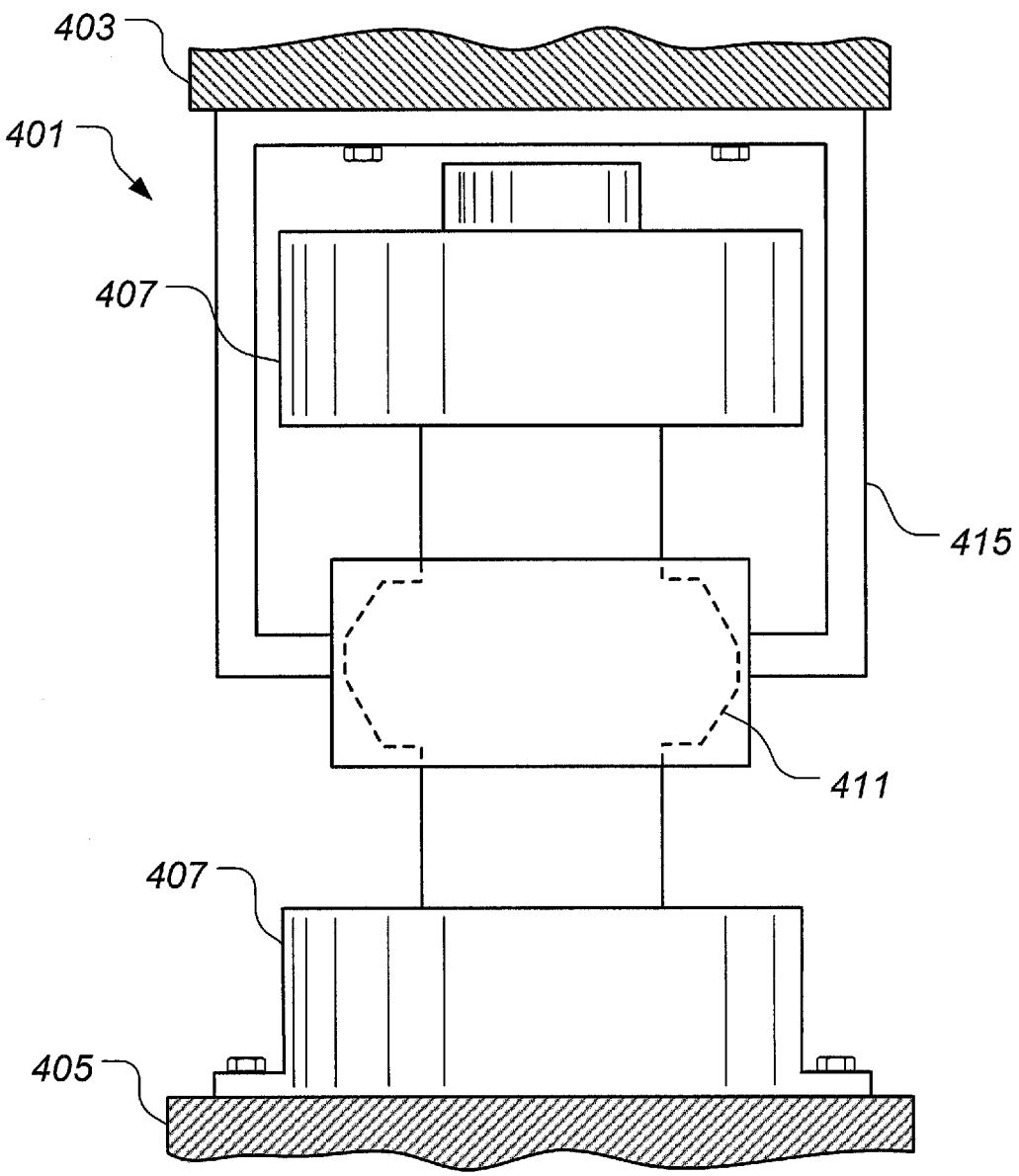
FIG. 4A is a front view of a vibration isolator according to the present application.

Referring now to FIG. 4A in the drawings, a vibration isolator 401 for use on an aircraft is illustrated. Isolator 401 includes a generally cylindrical housing 407. In the illustrated embodiment, housing 407 is rigidly divided between an upper housing and a lower housing. A piston 411 of selected cross-sectional diameter is disposed within the interior of housing 407. Housing 407 is typically coupled to a fuselage 405 of an aircraft and piston 411 is typically coupled to the transmission and propulsion system of the aircraft (not shown) via a pylon assembly 403 at an attachment bracket 415. In such an arrangement, fuselage 405 serves as the body to be isolated from vibration, and pylon assembly 403 of the aircraft serves as the vibrating body.

Figure 4B:
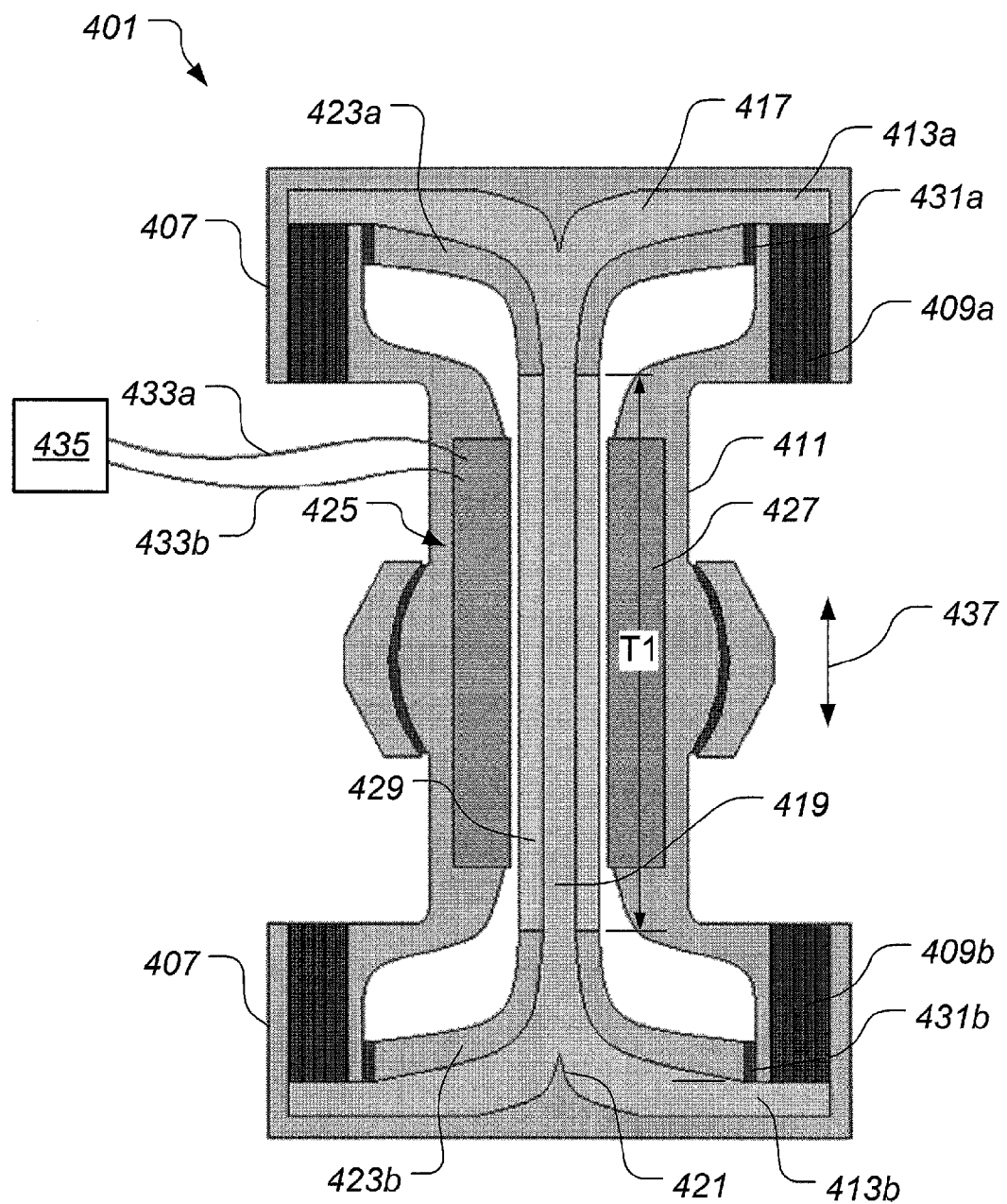
FIG. 4B is a partial cross-sectional view of the vibration isolator of FIG. 4A.

Referring now also to FIG. 4B, vibration isolator 401 is illustrated in a cross section view. An upper fluid chamber 413a is partially defined by the interior of an upper portion of housing 407. A lower fluid chamber 413b is partially defined by the interior of a lower portion of housing 407. Piston 411 is resiliently located against the upper and lower portions of housing 407 with elastomer members 409a and 409b, respectively. A tuning port or passage 419 extends centrally through piston 411 and permits a vibration-isolation fluid 417 to move between upper fluid chamber 413a and lower fluid chamber 413b, through tuning passage 419. The approximate length of tuning passage 419 is defined by T1 in FIG. 4B. A conical flow diverter 421 is provided at each end of upper fluid chamber 413a and lower fluid chamber 413b and is aligned with and generally opposes the opening at each end of tuning passage 419. Each conical flow diverter 421 enhances fluid flow by decelerating the vibration-isolation fluid as it flows from each end of the fluid chamber into and out of tuning passage 419.

A linear induction motor assembly 425 includes a magnet member 429 and inductance coils 427. Magnet member 429 is generally cylindrical with an interior surface forming tuning passage 419. Magnet member 429 is in contact at each end with an upper pumper piston 423a and a lower pumper piston 423b. Upper pumper piston 423a and lower pumper piston 423b are each cone shaped, the larger circular end being coupled to piston 411 with pumper elastomer members 431a and 431b, while the narrow end of upper pumper piston 423a and lower pumper piston 423b being in contact with magnet member 429.

Vibration-isolation fluid 417, also referred to as tuning fluid, is preferably a high-density, low-viscosity fluid disposed within tuning passage 419 and fluid chambers 413a and 413b. In addition to sealing the vibration-isolation fluid 417 in fluid chambers 413a and 413b, elastomer members 409a and 409b function as a spring to permit piston 411 to move or oscillate relative to housing 407, while maintaining piston 411 in a central location in housing 407 when no load is applied.

During operation of vibration isolator 401, elastomer members 409a and 409b function at least as a spring to permit piston 411 to move or oscillate relative to housing 407. The introduction of a force into piston bracket 415 displaces piston 411 relative to housing 407 in a direction 437. Because the force and displacement is oscillatory over time, piston 411 similarly oscillates relative to housing 407. Each oscillatory displacement of piston 411 relative to housing 407 similarly causes a displacement of upper pumper piston 423a and lower pumper piston 423b. A displacement of upper pumper piston 423a and lower pumper piston 423b in a first direction causes a displacement of tuning fluid through tuning passage 419 in the opposite direction of the displacement of piston 411. The displacement of piston 411 causes an oscillatory reaction force due to strain in elastomer members 409a and 409b. At the same time, the volumes of vibration-isolation fluid 417 in fluid chambers 413a and 413b are alternately increased and decreased such that vibration-isolation fluid 417 is pumped back and forth through tuning passage 419. The inertial force created by acceleration of the mass of the vibration-isolation fluid 417 is out of phase of the force introduced to piston 411 via bracket 415. At an isolation frequency, the force of the mass of the vibration-isolation fluid 417 cancels the force introduced to piston 411 via bracket 415. In some embodiments, a small amount of undesirable damping can occur at the isolation frequency; thereby preventing complete force cancellation from occurring, as such, a small amount of vibratory force can sometimes be transferred from vibrating body 403 to isolated body 405.

A passive isolation frequency of isolator 401 is in part, a function of the ratio of the effective piston area of upper pumper piston 423a and lower pumper piston 423b, to the diameter of tuning passage 419. As such, the isolator 401 is sized so the isolation frequency cancels the predicted vibratory frequency of vibrating body 403. When the source of vibration in vibrating body 403 is a rotor system of an aircraft, the vibratory frequency is typically the n/revolution frequency, where n is the number of rotor blades rotating around a mast axis of rotation at a certain rotational speed. However, some rotorcraft may be variable RPM rotorcraft, in that the rotorcraft can have the ability to operate in a range of rotor RPM's. Further, other factors, such as temperature, aging of elastomer members, tolerance variations, to name a few, make it desirable to actively change the isolation frequency of isolator 401.

Isolator 401 is configured to actively change the isolation frequency with linear inductance motor assembly 425. Control system 435 is electrically coupled via electrical leads 433a and 433b to inductance coils 427 for selectively providing oscillatory forces to upper pumper piston 423a and lower pumper piston 423b, via magnet 429. More specifically, linear inductance motor assembly 425 can actively adjust the isolation frequency of isolator 401 by modifying the acceleration of the vibration-isolation fluid 417, thereby modifying the inertial force of the vibration-isolation fluid 417 as it is accelerated back and forth through tuning passage 419. Control system 435 is configured to select the frequencies and the oscillatory forces imparted on upper pumper piston 423a and lower pumper piston 423b, via magnet 429. In this manner, the oscillatory vibrations from the vibrating body 403 are prevented from transferring to isolated body, even when the vibratory frequency of vibratory body 403 changes. Further, linear inductance motor assembly 425 can be operated to deepen the isolation frequency to negate any dampening losses.

The isolation frequency ($f_i$) of vibration isolator 401 is can be represented by the following equation:

$$f_i = \frac{1}{2\pi}\sqrt{\frac{K}{R(R-1)m_t}}$$

In the above equation, R represents the ratio of the effective cross sectional area of upper pumper piston 423a and lower pumper piston 423b, to the cross sectional area of tuning passage 419. Mass of tuning fluid 417 is represented by $m_t$. The spring rate of elastomer members 409a and 409b is represented by K.

Figure 4C:
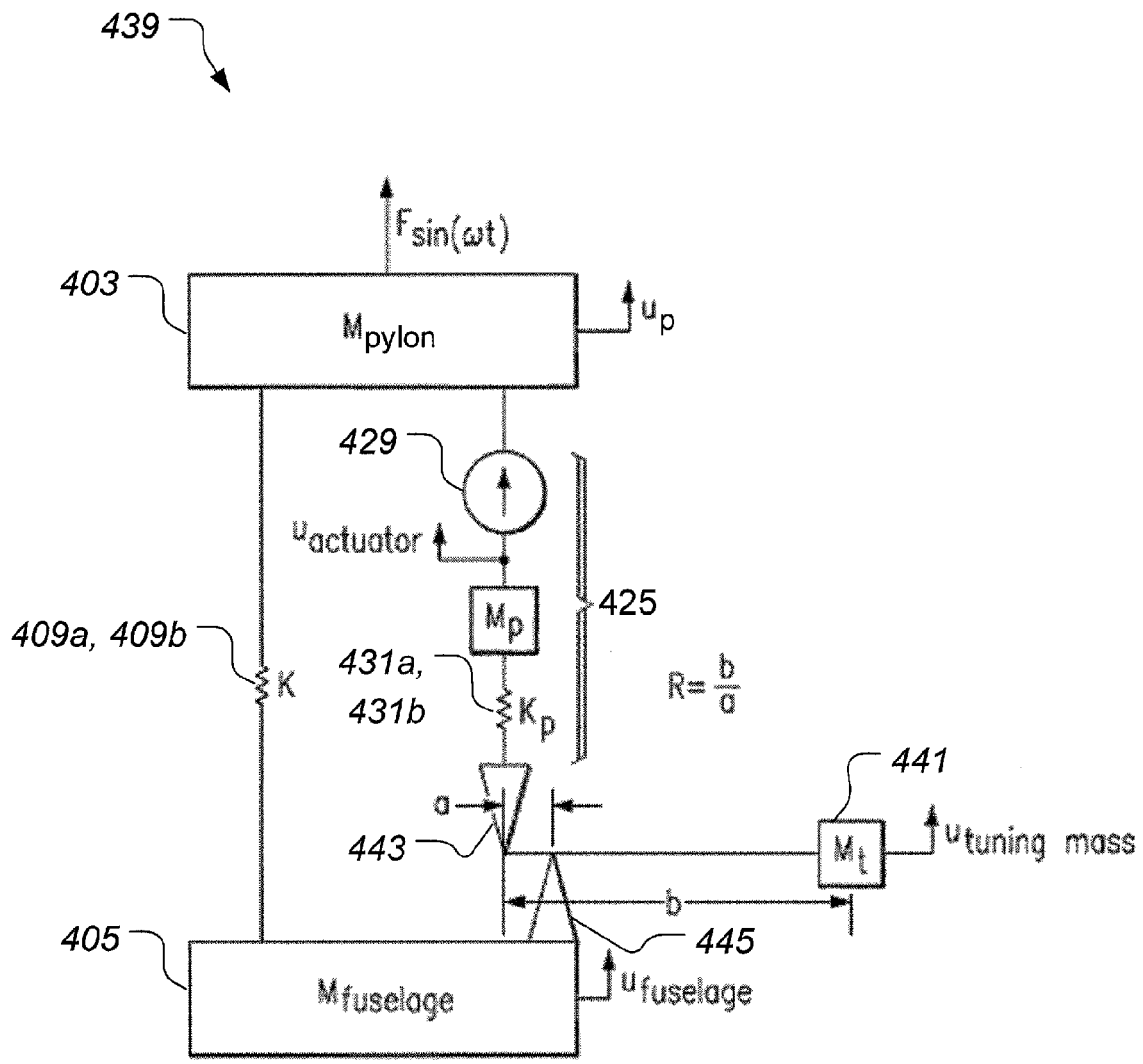
FIG. 4C is a mechanical equivalent model for the tunable vibration isolator according to the vibration isolation of FIG. 4A.

Referring now to FIG. 4C in the drawings, a mechanical equivalent model 439 for the tunable vibration isolator according to the present application is illustrated. The tunable vibration isolator of the present application is preferably used to isolate the vibration generated by the transmission and propulsion system of an aircraft, such as aircraft 11, 111, and 211, from the fuselage, such as fuselages 13, 114, and 214 (see FIGS. 1-3). However, it should be understood that although the tunable vibration isolator of the present application is described herein with respect to an aircraft application, it may be used in any application in which it is desirable to isolate the vibration between one body and another. The following discussion of the preferred embodiment of the present application will be with respect to an application of the tunable vibration isolator on a rotorcraft aircraft 11 (see FIG. 1) to isolate the vibratory forces generated in a pylon from a fuselage.

In mechanical equivalent model 439, the fuselage is represented as the mass of the fuselage $M_{fuselage}$, or box 405; the pylon is represented as the mass of the pylon $M_{pylon}$, or box 403; and a box 441 represents the mass of the tuning mass $M_t$, which in the present embodiment can be vibration-isolation fluid disposed in the isolator. A vibratory force $F \cdot \sin(\omega t)$ is generated by the propulsion system.

Force $F \cdot \sin(\omega t)$ causes an oscillatory displacement $u_p$ of the pylon $M_{pylon}$; an oscillatory displacement $u_{fuselage}$ of the fuselage $M_{fuselage}$; and an oscillatory displacement $u_{tuning\ mass}$ of the tuning mass $M_t$. A spring member, represented by a spring 409a and 409b, is disposed between the fuselage $M_{fuselage}$ and the pylon $M_{pylon}$. Spring 409a and 409b has a spring constant K.

Tuning mass $M_t$ is operably associated with fuselage $M_{fuselage}$ and pylon $M_{pylon}$. In mechanical equivalent model 439, tuning mass $M_t$ functions as if cantilevered from a first fulcrum 443 attached to pylon member $M_{pylon}$, and a second fulcrum 445 attached to the fuselage $M_{fuselage}$. The distance a from first fulcrum 443 to second fulcrum 445 represents the cross-sectional area of the tuning passage, and the distance b from first fulcrum 443 to the tuning mass $M_t$ represents the effective cross-sectional area of a piston (see 423a and 423b in FIG. 4B), such that an area ratio, or hydraulic ratio, R is equal to the ratio of b to a.

An active tuning element 425 is disposed between the pylon $M_{pylon}$ and the tuning mass $M_t$. Active tuning element 425 functions to make fulcrum 443 vibrate. It should be understood that active tuning element 425 may represent a plurality of active tuning elements acting either together or independently. In the preferred embodiment, active tuning element is a linear inductance motor assembly.

Active tuning element 425 can be represented by mechanical properties include a spring element 431a, 431b having a spring constant $k_p$, a mass $M_p$, and a controllable force element 429. Controllable force element 429 may have any phase angle and be of any magnitude within the maximum capabilities of active tuning element 425. Active tuning element 425 also includes control circuitry for controlling the actuation of active tuning element 429. Active tuning element 425 allows for selective actuation of the tuning mass. Mechanical equivalent model 439 leads to the following equation of motion for the system:

$$\begin{bmatrix} M_{fuselage} + (R-1)^2 M_t & -R(R-1)M_t & 0 \\ -R(R-1)M_t & M_{pylon} + R^2 M_t & 0 \\ 0 & 0 & M_p \end{bmatrix} \begin{Bmatrix} \ddot{u}_{fuselage} \\ \ddot{u}_{pylon} \\ \ddot{u}_{actuator} \end{Bmatrix} + \begin{bmatrix} K & -K & 0 \\ -K & K+k_p & -k_p \\ 0 & -k_p & k_p \end{bmatrix} \begin{Bmatrix} u_{fuselage} \\ u_{pylon} \\ u_{actuator} \end{Bmatrix} = \begin{Bmatrix} F_p \\ 0 \\ -F_p \end{Bmatrix}$$

Figure 5:
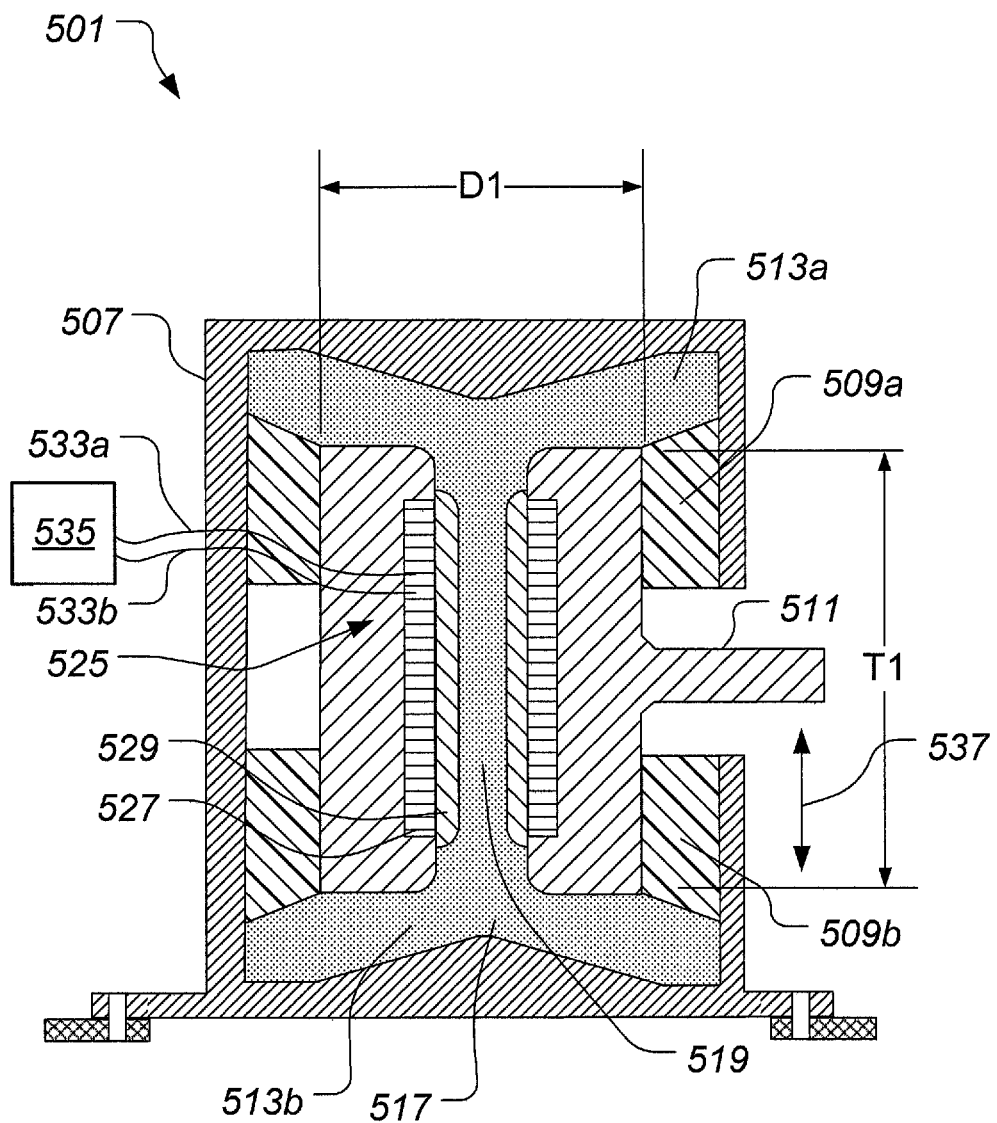
FIG. 5 is a cross-sectional view of a vibration isolator according to an alternative embodiment of the present application.

Referring now also to FIG. 5, a vibration isolator 501 is an alternative embodiment of vibration isolator 401. Vibration isolator 501 is substantially similar to vibration isolator 401. An upper fluid chamber 513a is partially defined by the interior of an upper portion of housing 507. A lower fluid chamber 513b is partially defined by the interior of a lower portion of housing 507. Piston 511 is resiliently located against housing 507 with elastomer members 509a and 509b. A tuning port or passage 519 extends centrally through piston 511 and permits a vibration-isolation fluid 517 to move between upper fluid chamber 513a and lower fluid chamber 513b, through tuning passage 519. The approximate length of tuning passage 519 is defined by T1 in FIG. 5.

A linear induction motor assembly 525 includes a magnet member 529 and inductance coils 527. Magnet member 529 is generally cylindrical with an interior surface at least partially forming tuning passage 519. Magnet member 529 preferable has curved end portions that contribute to the pumping of fluid 517 between fluid chambers 513a and 513b. Magnet member 529 is slidingly coupled to piston 511 such that a magnetic force generated by inductance coil 527 causes magnet member 529 to slide or otherwise translate relative to piston 511. The end portions of magnet member 529 act like a piston when slidingly displaced relative to piston 511, so as to accelerate tuning fluid 517 through tuning passage 519, in the opposite direction of the displacement of magnet 529.

Vibration-isolation fluid 517, also referred to as tuning fluid, is preferably a high-density, low-viscosity fluid disposed within tuning passage 519 and fluid chambers 513a and 513b. In addition to sealing the vibration-isolation fluid 517 in fluid chambers 513a and 513b, elastomer members 509a and 509b function as a spring to permit piston 511 to move or oscillate relative to housing 507, while maintaining piston 511 in a central location in housing 507 when no load is applied.

During operation of vibration isolator 501, elastomer members 509a and 509b function at least as a spring to permit piston 511 to move or oscillate relative to housing 507. The introduction of a force into piston bracket 415 (shown in FIG. 4A) displaces piston 511 relative to housing 507 in a direction 537. Because the force and displacement is oscillatory over time, piston 511 similarly oscillates relative to housing 507. A displacement of piston 511 in a first direction causes a displacement tuning fluid 517 through tuning passage 519 in the opposite direction of the displacement of piston 511. The displacement of piston 511 causes an oscillatory reaction force due to strain in elastomer members 509a and 509b. At the same time, the volumes of vibration-isolation fluid 517 in fluid chambers 513a and 513b are alternately increased and decreased such that vibration-isolation fluid 517 is pumped back and forth through tuning passage 519. The inertial force created by acceleration of the mass of the vibration-isolation fluid 517 is out of phase of the force introduced to piston 511 via bracket 415 (shown in FIG. 4A). At an isolation frequency, the force of the mass of the vibration-isolation fluid 517 cancels the force introduced to piston 511 via bracket 415 (shown in FIG. 4A). In some embodiments, a small amount of damping can occur at the isolation frequency; thereby preventing complete force cancellation from occurring, as such, a small amount of vibratory force can sometimes be transferred from vibrating body 403 (shown in FIG. 4A) to isolated body 405 (shown in FIG. 4A).

A passive isolation frequency of isolator 501 is in part, a function of the ratio of the effective piston area of piston 511. In the illustrated embodiment, the end portions of magnet 529 also contribute to the effective piston area. As such, the isolator 501 is sized so the isolation frequency cancels the predicted vibratory frequency of vibrating body 403. When the source of vibration in vibrating body 403 is a rotor system of an aircraft, the vibratory frequency is typically the n/revolution frequency, where n is the number of rotor blades rotating around a mast axis of rotation at a certain speed. However, some rotorcraft may be variable RPM rotorcraft, in that the rotorcraft can have the ability to operate in a range of rotor RPM's. Further, other factors, such as temperature, aging of elastomer members, tolerance variations, to name a few, make it desirable to actively change the isolation frequency of isolator 501.

Isolator 501 is configured to actively change the isolation frequency with linear inductance motor assembly 525. Control system 535 is electrically coupled via electrical leads 533a and 533b to inductance coils 527 for selectively providing oscillatory forces to tuning fluid 517, via magnet 529. More specifically, linear inductance motor assembly 525 can actively adjust the isolation frequency of isolator 501 by modifying the acceleration of the vibration-isolation fluid 517, thereby modifying the inertial force of the vibration-isolation fluid 517 as it is accelerated back and forth through tuning passage 519. Control system 535 is configured to select the frequencies and of the oscillatory forces imparted on tuning fluid 517, via magnet 529. In this manner, the oscillatory vibrations from the vibrating body 403 are prevented from transferring to the isolated body, even when the vibratory frequency of vibratory body 403 changes. Further, linear inductance motor assembly 525 can be operated to deepen the isolation frequency to negate any dampening losses.

Figure 6:
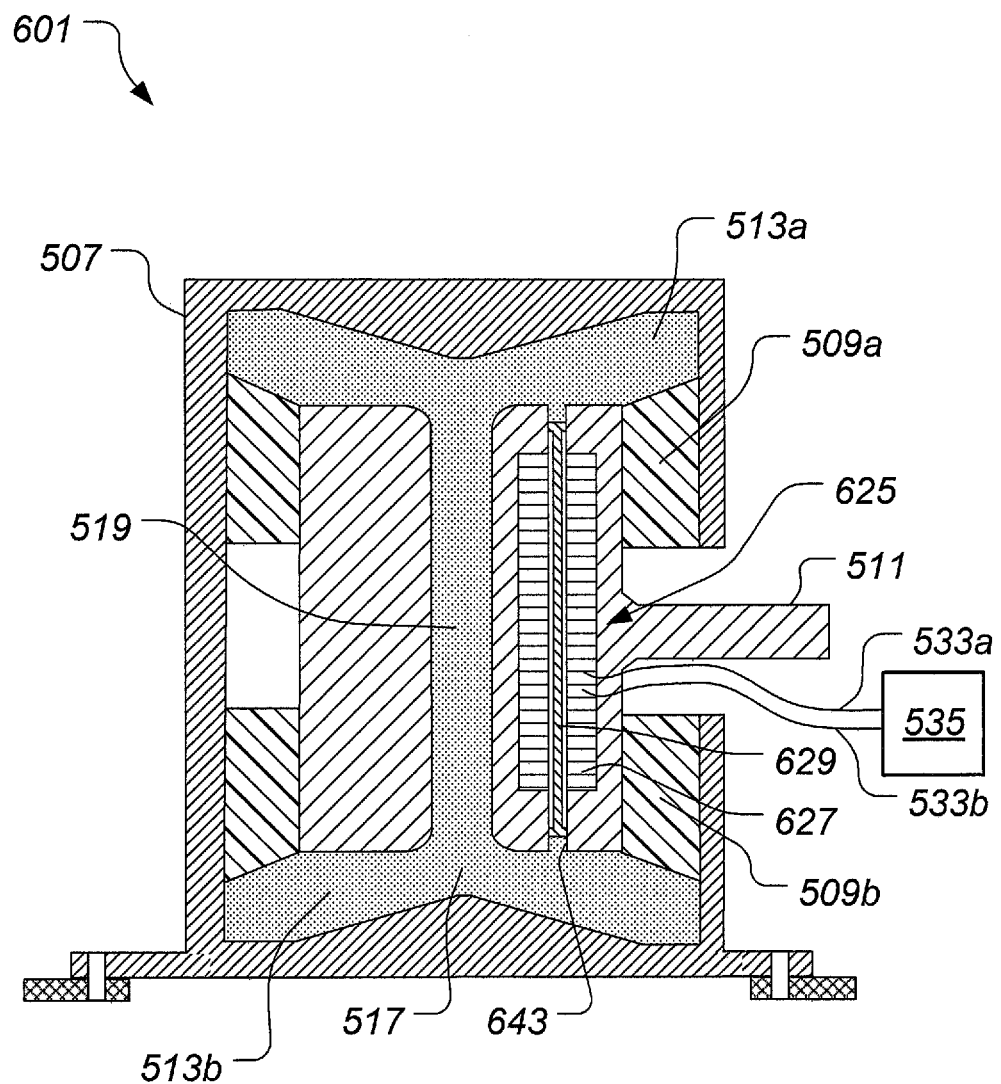
FIG. 6 is a cross-sectional view of a vibration isolator according to an alternative embodiment of the present application.

Referring now also to FIG. 6, an isolator 601 is a substantial similar alternative embodiment of isolator 501. Further, the discussion herein with regard to isolator 501 substantially applies to isolator 601. However, isolator 601 includes a linear inductance motor assembly 625 having a magnet 629 and inductance coils 627 that are integrated into the interior of the body of piston 511. Magnet 629 is selectively actuated by inductance coils 627. Magnet 629 is configured as a piston, and is located in an internal piston passage 643, such that actuation of magnet 629 pumps tuning fluid 517 between upper and lower fluid chambers 513a and 513b. Selective actuation of magnet 629 changes the isolation frequency of isolator 601.

Figure 7:
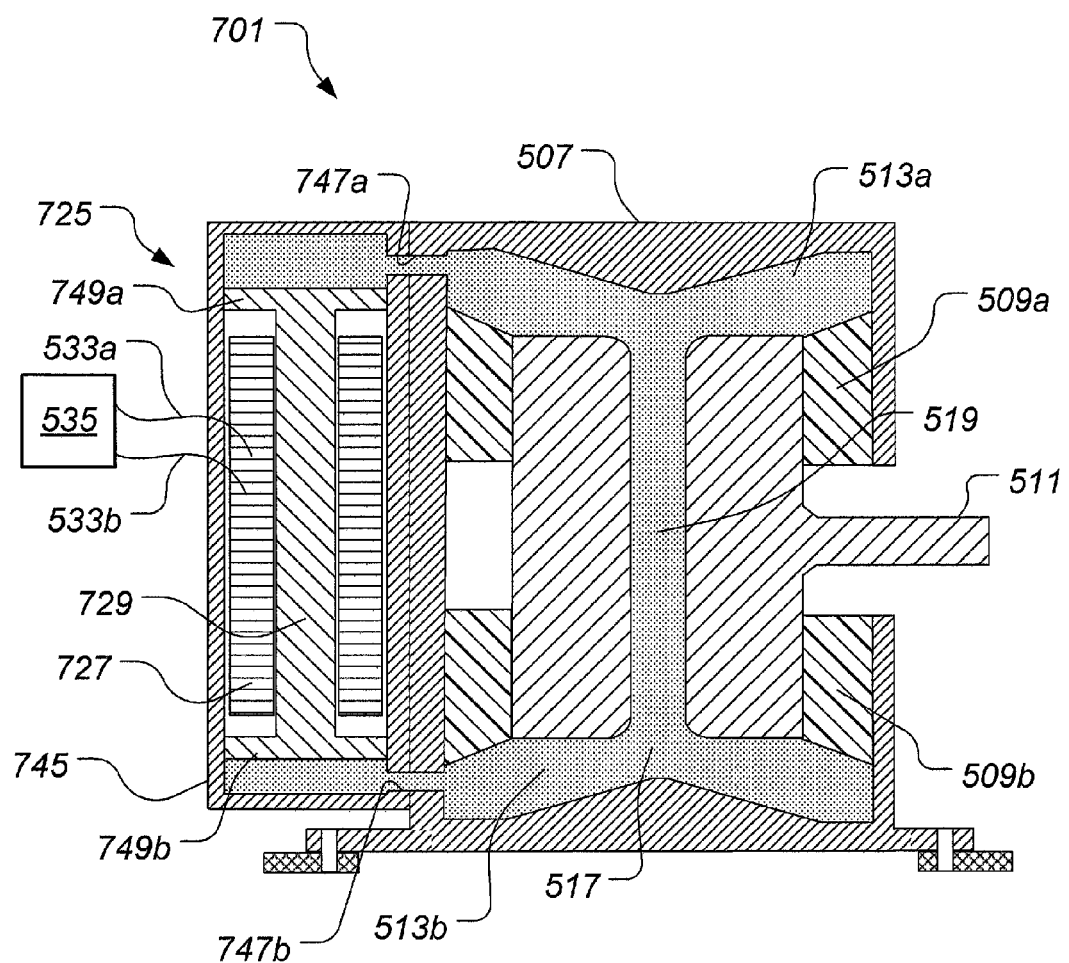
FIG. 7 is a cross-sectional view of a vibration isolator according to an alternative embodiment of the present application.

Referring now also to FIG. 7, an isolator 701 is a substantial similar alternative embodiment of isolators 501 and 601. Further, the discussion herein with regard to isolators 501 and 601 substantially applies to isolator 701. However, isolator 701 includes a linear inductance motor assembly 725 having a magnet 729 and inductance coils 727 that are located in an external housing 745. Magnet 729 is selectively actuated by inductance coils 727. Magnet 729 is configured as a piston such that actuation of magnet 729 pumps tuning fluid 517 between upper and lower fluid chambers 513a and 513b through ports 747a and 747b, respectively. Magnet 729 can have piston end portions 749a and 749 that are of a material that is non-magnetic. Selective actuation of magnet 729 changes the isolation frequency of isolator 701, by changing the internal mass of tuning fluid 517 traveling through tuning passage 519.

Figure 8:
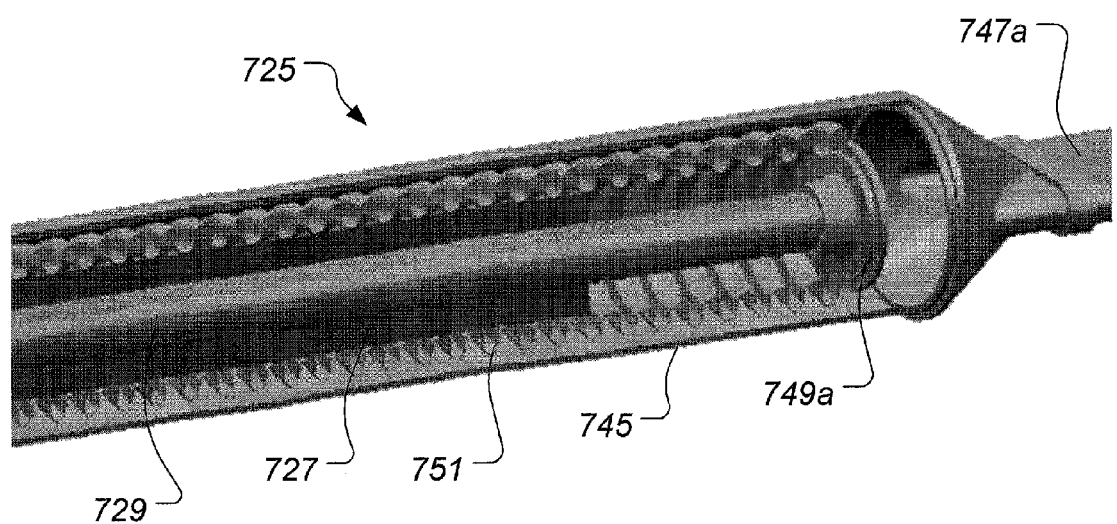
FIG. 8 is a perspective view of an embodiment of a linear inductance motor assembly from the vibration isolator of FIG. 7, according to the present application.

Referring now also to FIG. 8, a portion of an embodiment of linear inductance motor assembly 725, from isolator 701, is illustrated in further detail. As shown in FIG. 8, linear inductance motor assembly 725 can include a baffle 751 that houses magnet 729 and inductance coils 727. Baffle 751 is preferable of a metallic material, but may be any material capable of resisting fatigue. Baffle 751 is preferable coupled to each end of piston portion 749a and 749b. Baffle 751 is configured to protect magnet 729 and inductance coil 727 from tuning fluid 517.

It is apparent that a system with significant advantages has been described and illustrated. Although the present application is shown in a limited number of forms, it is not limited to just these forms, but is amenable to various changes and modifications without departing from the spirit thereof.

The invention claimed is:

1. A vibration isolator, comprising:
   a housing having an upper fluid chamber and a lower fluid chamber;
   a tuning passage;
   a tuning fluid disposed within the tuning passage, the upper fluid chamber, and the lower fluid chamber;
   a primary piston resiliently disposed within the housing;
   an upper pumper piston and a lower pumper piston, the upper pumper piston and the lower pumper piston being coupled to the primary piston, the upper pumper piston and lower pumper piston defining the tuning passage;
   a linear inductance motor assembly comprising:
      a magnet member coupled between the upper pumper piston and the lower pumper piston;
      an inductance coil at least partially surrounding the magnet member; and
      a control system configured to selectively actuate the magnet member, wherein selective actuation of the magnet member selectively imparts a force upon the upper pumper piston and the lower pumper piston; and
   wherein a length of the tuning passage is defined by the magnet.

2. The vibration isolator according to claim 1, wherein the upper pumper piston and the lower pumper piston are each coupled to the primary piston with at least one elastomer member.

3. The vibration isolator according to claim 1, wherein the upper pumper piston and the lower pumper piston are each conical shaped.

4. The vibration isolator according to claim 1, wherein the inductance coil is configured to translate the magnet relative to the inductance coil.

5. The vibration isolator according to claim 1, wherein the linear inductance motor assembly is configured to selectively contribute to the amount of volume of the tuning fluid pumped through the tuning passage during an actuation of the primary piston.

6. The vibration isolator according to claim 1, wherein the inductance coil is partially embedded in the primary piston.

7. A vibration isolator, comprising:
   a housing having an upper fluid chamber and a lower fluid chamber;
   a tuning passage;
   a tuning fluid disposed within the tuning passage, the upper fluid chamber, and the lower fluid chamber;
   a piston resiliently disposed within the housing;
   a pumper piston defining the tuning passage
   a linear inductance motor assembly comprising:
      a magnet member configured to translate relative to the piston, the magnet member unobstructing the flow of fluid through the tuning passage;
      an inductance coil at least partially surrounding the magnet member; and
      a control system configured to selectively actuate the magnet member;
   wherein selective actuation of the magnet member selectively imparts a pumping force on the tuning fluid; and
   wherein the tuning passage is at least partially defined by the magnet.

8. The vibration isolator according to claim 7, wherein the magnet member has end portions that form a piston, such that a displacement of the magnet member relative to the piston acts to accelerate the tuning fluid in the opposite direction of the displacement of the magnet member.

9. The vibration isolator according to claim 7, wherein the magnet member is configured to slidingly translate relative to the piston.

10. The vibration isolator according to claim 7, wherein the inductance coil is configured to translate the magnet relative to the inductance coil.

11. The vibration isolator according to claim 7, wherein the linear inductance motor assembly is configured to selectively contribute to the amount of volume of the tuning fluid pumped through the tuning passage during an actuation of the piston.

12. The vibration isolator according to claim 7, wherein the inductance coil is at least partially embedded in the piston.

13. The vibration isolator according to claim 7, wherein the magnet member is located in an internal piston passage, the internal piston passage being a port located through the piston, internal piston passage being separate from the tuning passage.

14. The vibration isolator according to claim 13, wherein the inductance coil at least partially surrounds the internal piston passage.

* * * * *